Jan. 3, 1933.   L. BREGUET   1,893,395
DEVICE FOR STABILIZING AND CONTROLLING AIRCRAFT PROVIDED
WITH ROTATABLE WINGS OF THE HELICOPTER TYPE
Filed March 15, 1930   3 Sheets-Sheet 1
Fig:1
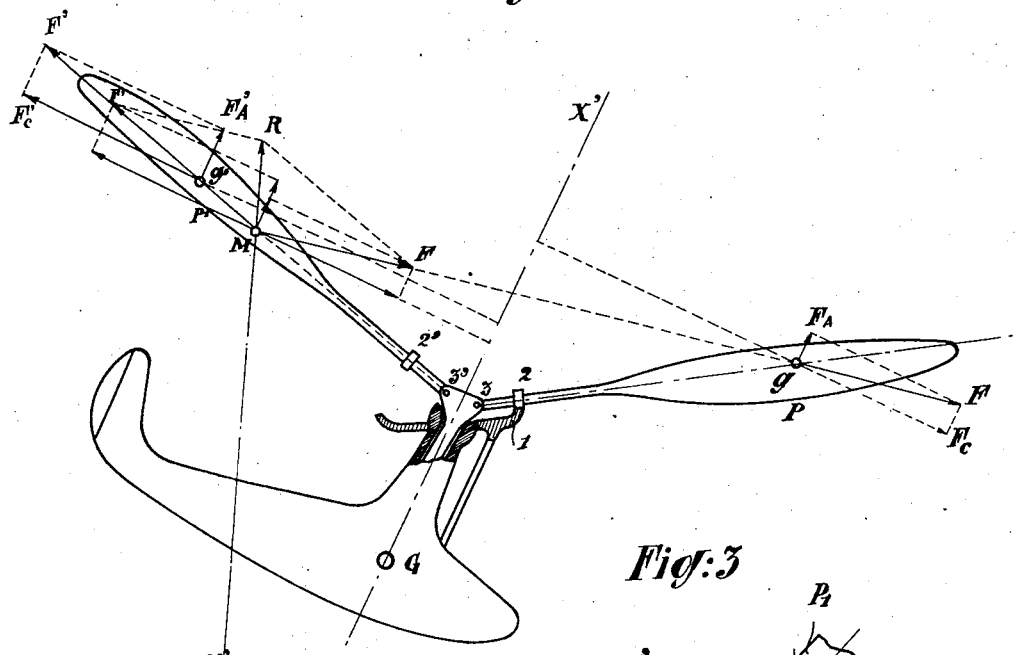
Fig:3
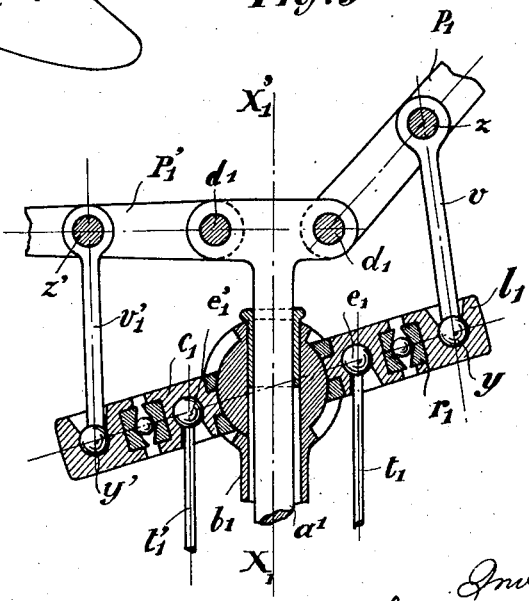
Inventor:
Louis Breguet
By Mauro & Lewis
Attorneys

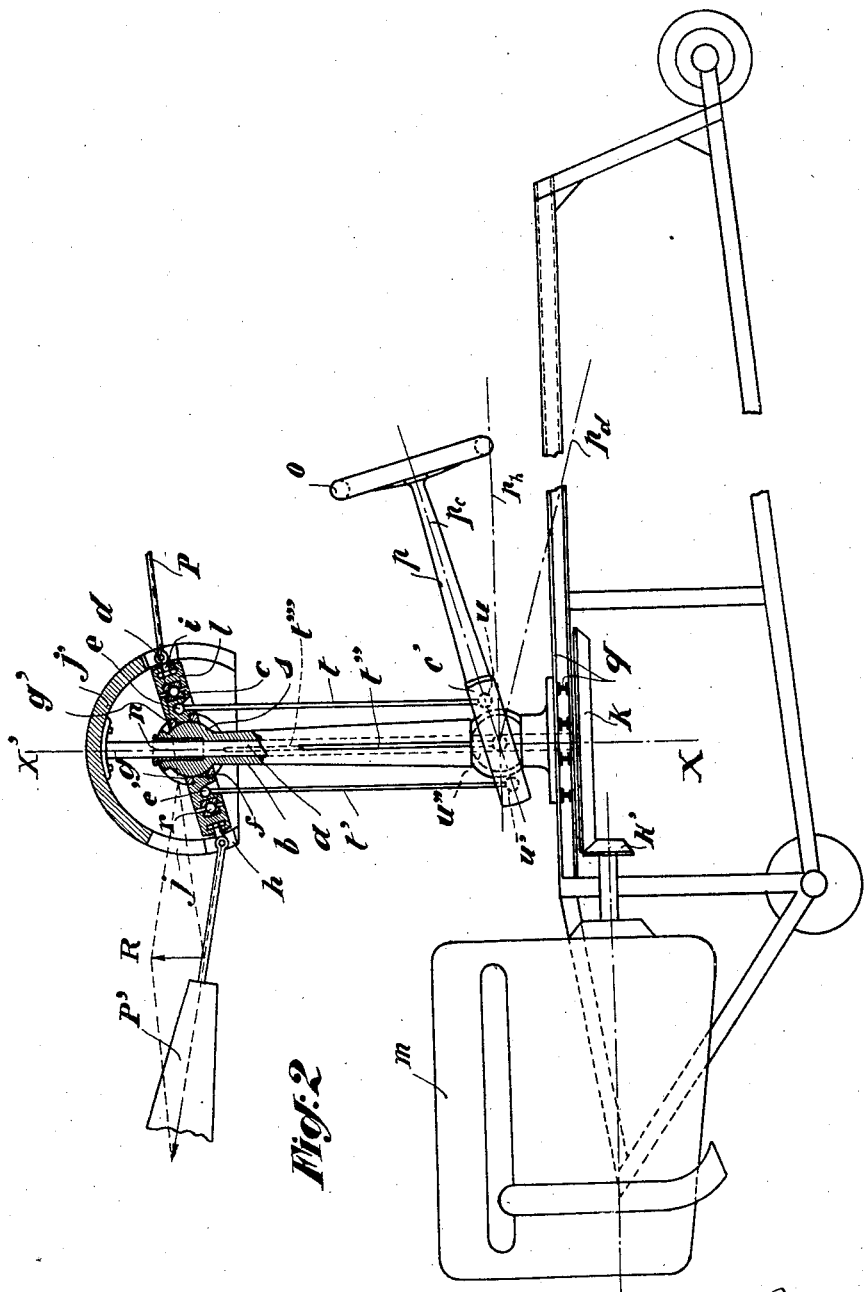

Patented Jan. 3, 1933

1,893,395

UNITED STATES PATENT OFFICE

LOUIS BREGUET, OF PARIS, FRANCE

DEVICE FOR STABILIZING AND CONTROLLING AIRCRAFT PROVIDED WITH ROTATABLE WINGS, OF THE HELICOPTER TYPE

Application filed March 15, 1930, Serial No. 436,144, and in France March 15, 1929.

The present invention relates to means for stabilizing and controlling aircraft employing rotatable wing devices actuated by an engine, or, when the engine is uncoupled, by the relative wind, as in aircraft of the helicopter type.

The said wing devices are rotatable about their respective axes, which are optionally concentric, and are as a rule substantially vertical, and whose position may be changed at will. Each rotatable blade or wing is mounted upon a joint or pivot which is perpendicular to the general axis of rotation, according to an arrangement which is known per se and is described chiefly in the French patent to Mr. Louis Breguet No. 395,756 dated the 28th of October 1908 (page 2, line 73 and following, Figure 10), and the said pivot arrangement assures to each rotating blade a certain freedom of movement enabling its oscillation in the plane in which it is comprised and which passes through the axis of rotation.

The present invention relates to means for stabilizing and controlling the said aircraft, which consists essentially in guiding, according to a determined law, the displacement of the blades or wings in the plane passing through the axis about which they are rotated by suitable gear under the control of the pilot, thus employing for the stability or the operation of the aircraft, the reactions produced by the wing devices upon their guiding elements.

The said blades may be guided by means of a cam, a roller race, a ball bearing, or the like, which is mounted after the manner of a universal joint and is adapted to impart to said blades an angular or a rectilinear displacement in the plane of the axis of rotation. The said device is controlled by a lever which may be inclined in all directions, or by a lever provided with a hand wheel or a rocking arm, with the optional addition of a servo-motor.

The following description, with reference to the accompanying drawings which are given by way of example, shows various embodiments of the invention.

Figure 1 is a diagrammatic view showing the principle of the invention.

Figure 2 relates to a form of construction comprising a single flying device or set of blades, this being shown in section on a plane comprising the axis of rotation of the wings or blades.

Figure 3 is a like view relating to a second form of construction.

Figure 1 shows the principle of the invention as applied to an apparatus whose centre of gravity is situated at G and which is provided with a single rotatable wing device consisting of wings or blades such as P and P′, rotating on an axis X X′, said wing device being freely rotatable, or driven by a motor.

Figure 4:
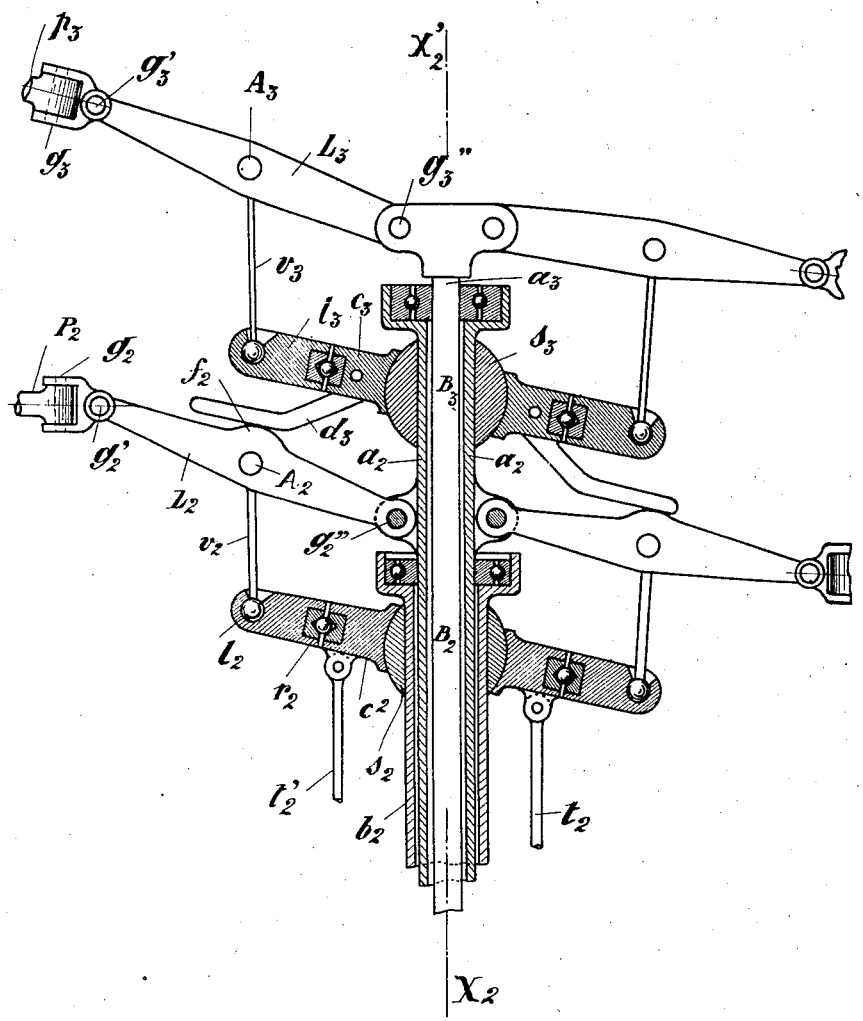
Figure 4 is a modification of Figure 3, comprising a double flying device or set of blades.

As above stated, each blade is pivoted on an axle 3 whose axis is perpendicular to the axis X X′ and also to the axis of the blade. This method of pivoting is not exclusive of other pivoting arrangements which are perpendicular to the axis of the blade.

The apparatus is shown in side view in Figure 1, with the front part situated to the right of the figure.

To the main frame of the apparatus is connected a cam, a roller race, or the like, which can be displaced at will by the pilot.

Upon the roller race, which is inclined in the figure in such manner as to raise the blades when these are moved in the sector situated at the front of the apparatus, are caused to roll alternately the rollers 2 and 2′ which are respectively mounted on the blades P and P′.

Figure 1 shows the roller 2 mounted on the blade P and rolling on the race or cam 1.

When the said roller contacts with the cam, the blade P will oscillate vertically about the axle 3, and the cam or ramp 1 is thus given a downward thrust due to the combined centrifugal and aerodynamic forces.

As will be further observed, this produces a couple tending to move the aircraft downwardly in its travel.

Each blade P or P′ is in fact subjected to centrifugal force $F_c$ or $F'_c$ due to the rotation and to the resulting aerodynamic stresses $F_A$ or $F'_A$ which, in the same manner as $F_c$ or $F'_c$, will be assumed as applied at the centre of gravity $g$ or $g'$ of the corresponding blade.

The centrifugal forces $F_c$ or $F'_c$ are substantially equal, since the distance from $g$ or $g'$ to the axis of rotation X X' will hardly vary during the rotation.

The blade P' which is supposed to freely pivot upon 3', in the position shown in Figure 1, turns in the direction of the resultant F' of the forces $F'_c$ and $F'_A$.

The blade P, when rising during its travel through the front region of the apparatus, that is, in the right hand part of Figure 1, by the action of the cam or ramp 1 upon the roller 2, is given a vertical ascending speed which reduces the incidence of the blade relatively to the resulting aerodynamic speed, and hence the force $F_A$ will be less than the force $F'_A$, and its magnitude and direction can be regulated at will by the position given to the cam or ramp 1 by means of transmission gear.

The combined action exercised by the rotating blades P P' upon the main frame of the apparatus is represented by the resultant R of the forces F and F' acting upon the said blades. It is evident, as shown in Figure 1, that the line of action M M' of the resultant R passes at the rear of the centre of gravity G of the whole apparatus, and the latter is thus subjected to a downwardly driving couple whose value can be regulated at will, as is evident from the preceding considerations.

On the other hand, if by the use of a double-acting ramp, the blades are lowered when proceeding in the rear part of the apparatus, (or to the left of Figure 1,) the aerodynamic stresses will be therein reinforced, due to an increase in the aerodynamic incidence, and the ramp is thus subjected to an upward reaction which produces, relatively to the centre of gravity of the apparatus, an added downwardly driving couple, so that the apparatus will be inclined until it reaches a position of equilibrium depending upon the angle of inclination attained and also upon the aerodynamic reactions due to the horizontal travel of the apparatus.

In fact, a forward inclination will evidently produce a propulsive force which depends directly upon the inclination. In this manner, by reason of the device by which the pilot can suitably incline the apparatus, it is possible to produce a propulsive force of sufficient power and in such directions as the pilot may desire, and this is done without any special propelling device.

If the circular ramp or cam is inclined towards the side of the apparatus, the same considerations show that the apparatus can incline laterally.

In a general manner, if the plane of the ramp is inclined in any direction, the whole apparatus inclines in the contrary direction.

Figure 2 shows by way of example a form of construction, on a somewhat different conception, of the device according to the invention as applied to the pilot's longitudinal and transverse control of an apparatus employing rotatable wing devices.

A cam, ramp or roller race suitably disposed or operated by the pilot, is no longer employed to give the blade an angular displacement about an axis perpendicular to the said blade and to the axis of rotation of the set of blades, but as comprised in the principle of the invention, the pivot axle of said blade, which is optionally disposed outside of the axis of rotation of the set of rotating blades, is given a movement of translation in the plane of rotation of the said blade, that is, in the plane formed by the axis of rotation of the set of blades and the axis of the blade, represented by the general direction of its elongation.

The apparatus essentially comprises blades such as P and P' which are freely pivoted through axles $d$ to sliders $h$, each slider being held by an arm $i$ rotatable in a recess formed in a ring $l$; said ring is mounted on a ball bearing forming a double thrust element, and it is rotatable in the plane of the pivoting disk $c$ mounted on a ball $s$ which is secured to the frame $q$ of the apparatus by the upright $b$. Thus the axles $d$ may be given, as a relative displacement in the plane of the figure, a rotation about the centre $n$ of the ball $s$ when the disk $c$ effects this same rotation.

On the other hand, since the slider $h$ is guided by the sector $j$, the axles $d$ which are perpendicular to the axis of the blade, will remain constantly perpendicular to X X' during this rotation.

The sector $j$ is in fact secured to the central shaft $a$ by means of the bell-shaped member $j'$. In this manner an apparatus may be constructed which comprises several blades in addition to the ones represented, and analogous to the same, and all of the said blades are mounted upon axles such as $d$ in suitable sliders which are slidable in grooves formed for the purpose in the said bell-shaped member $j'$, and are all mounted in an analogous manner upon the ring $l$.

The disk $c$ is adapted to take any position about the ball $s$, and it is held constantly parallel to a ring $c'$ which is pivoted to a ball disposed at the lower part of the upright $b$; the said disk $c$ and the ring $c'$ are in fact connected by rods such as $t$ $t'$ $t''$ etc., provided at their upper ends with balls $e$ $e'$ $e''$ etc., housed within corresponding recesses in the disk $c$, the lower ends of said rods having balls $u$ $u'$ $u''$ cooperating with corresponding recesses in the disk $c'$.

The disk or ring $c'$ is provided with a rigid shaft $p$ having at the end a hand wheel $o$. By pulling or pushing the said shaft while acting upon the hand wheel, the pilot may incline the ring $c'$ in any direction, thus actuating the upper mechanism controlling the blades. The shaft X X' is optionally actuated by the motor $m$, by means of the power transmission gear K and K' which comprises a releasing clutch.

The operation of the device shown in Figure 2, which device differs in some respects from Figure 1, is as follows:—

The cam 1 and the roller 2 shown in Figure 1 being replaced by the ball bearing $r$, the whole action takes place as if the attaching points $d\ d'$ of the blades P P' were actuated by a cam whose outline can be changed by the pilot according to the inclinations given by the lever $p$ to the ball bearing $r$. In the figure, $p_k$ represents the neutral or mean position of the lever; $p_c$ and $p_d$ represent the extreme positions. In other words, points $d$ and $d'$ are given two combined movements, to wit, a rotary movement about axis X X' which causes the propeller blades to revolve about said axis, and an oscillating movement in a radial vertical plane about the center of the bellshaped member $j'$. Obviously said oscillatory movement has the same period as the rotary movement, i. e. points $d$ and $d'$ are caused to move up and down along their slideways only once for each revolution of shaft $a$. On the other hand, the amplitude of said oscillatory movement is adjustable through lever $p$, said amplitude depending upon the angle between the plane of plate $c$ and a plane at right angles to shaft $a$. Finally, the phase of said oscillatory movement, that is to say the direction in which said plate $c$ is inclined and accordingly the direction in which said flying machine will be inclined, can also be adjusted through lever $p$ and hand wheel $o$.

It will be observed that when the lever is brought into the upper position $p_c$ the pilot can tilt up the apparatus (whose front end is at the left of the figure) and it may in fact be admitted that the inclination of the blade P, for instance, from the axis X X' will hardly be varied during a revolution about X X', and thus in the position shown in the figure, the lines of action of the resultant forces applied to the blades P and P' at their centre of gravity will intersect at a point situated to the left of X X'; the resultant R, which is thus parallel to the axis, proceeds to the rear of the centre of gravity. This produces, in the same conditions as in Figure 1, a couple exercised in the same direction.

Figure 3 shows a modification of the arrangement for driving the blades, the remainder of the device remaining the same as in Figure 2.

The blades $P_1\ P'_1$ are pivotally mounted on the axles $d_1\ d'_1$ which are secured to the shaft $a_1$ and are perpendicular to $X_1\ X'_1$; links $v\ v'$ are respectively pivoted at their upper ends to the blades $P_1\ P'_1$ by means of axles $z\ z'$ which are parallel to the axle $d_1$, and said links comprise at their lower ends the balls $y$ and $y'$ disposed in the ring $l_1$. The said ring is mounted on the ball bearing $r_1$ and is rotatable in the plane of the movable disk $c_1$, the inclination of said disk being controlled by the pilot in the same manner as the disk $c$ is controlled in Figure 2.

The whole action takes place as if the points $y\ y'$ followed, as in the preceding example, the outline of a cam which can be changed according to the inclinations given to the ball bearing $r_1$.

It will be readily observed that as in the preceding case, the inclination given to the ball bearing $r$ (Figure 3) will subject the apparatus to a couple situated in the plane of the figure and acting in the clockwise direction.

Hence by inclining the ball bearing, the pilot may operate the aircraft in any desired manner, in the case of the constructions shown in Figures 2 and 3.

Referring to Figure 2, it will be observed that by inclining the lever $p$, the pilot causes a movement of longitudinal rotation analogous to the effect of the elevating rudder of an ordinary aeroplane. By operating the hand-wheel $o$ he causes a rolling motion of the aircraft which is analogous to the wing warping in an ordinary aeroplane.

In certain cases, the efforts to be made by the pilot may exceed his power, or may at least be a cause of fatigue, and in this case the controlling lever $p$ will actuate the central bell-shaped member or ring by means of a servo-motor, of any kind, with the use of non-reversible driving gear. The device also permits, in the case of aircraft with a single flying device in horizontal motion, to compensate the rolling couple which may subsist, due to the fact that the blade which moves forward will act upon the air at a greater speed then that of the blade which moves backward, and is thus subjected to greater aerodynamic reactions than those acting upon this latter, which reactions are not entirely compensated by the free pivoting of the blades or by other means.

The present invention, which relates to a method of stabilizing and control, does not exclude the possibility of increasing the number of the flying devices, or of adding to the rotatable flying devices any desired parts by which their efficiency will be increased, for instance an arrangement adapted to change the incidence of the blades, analogous to the arrangement shown in Figure 11 of the aforesaid French Patent No. 395,756.

Figure 4 shows an apparatus comprising two sets of wings rotating in contrary directions and adapted to compensate chiefly the couples of rotation in the horizontal plane which are due to the reactions of the gearing transmitting the driving couple. The upper flying device is controlled by an intermediate ramp which repeats the inclinations imparted to the lower flying device by the main ramp which is controlled by the pilot.

In the apparatus represented in Figure 4, each blade $P_2$ of the aircraft is pivotally mounted on two axles $g_2$ $g'_2$ which are perpendicular to the axis of the blade. Thus the resultant of the aerodynamic stresses and the inertia stresses upon the blade $P_2$ will be brought upon the axle $g'_2$, which is mounted on a lever $L_2$, pivoted on the other hand, by means of an axle $g''_2$ which is parallel with $g'_2$, to a ring mounted on the shaft $a_2$ of the wing device of which the blade $P_2$ form a part.

To the lever $L_2$ is attached, by a ball joint or the like, a link $V_2$ which is pivoted by a ball joint, or like means, to a ring $l_2$ which is rotatable, in concentric disposition, about the movable disk $c_2$. The said ring $l_2$ rotates upon said disk by means of ball bearings $r_2$ forming a double thrust bearing. The said disk $c_2$ is pivotally mounted on a ball $s_2$ secured to the stationary upright $b_2$, said disk can be moved by means of several links, which are four in number in the case of the figure as shown at $t_2$ $t'_2$ (of which the two links situated in the plane perpendicular to the figure are not shown); said links are situated at right angles to one another on the disk $C_2$. In the same manner as for Figures 2 and 3, the said links can be actuated by the pilot by means of non-reversible driving gear, either directly by hand, or through the medium of a servo-motor.

As concerns the upper rotating wing device, the blades $P_3$ are pivoted in the same manner as the blades $P_2$ about axles $g_3$ $g'_3$, this latter axle being mounted on a lever $L_3$ similar to $L_2$ which is pivoted on the other hand, by means of an axle $g''_3$, to the shaft $a_3$ of the aforesaid upper wing device.

The said lever $L_3$ is operated, in the same manner as $L_2$, by a device comprising links $v_3$, a rotating ring $l_3$ and a movable disk $c_3$, analogous to the device $v_2$, $l_2$, $c_2$ employed to move the lever $L_2$. However, the movable disk $c_3$ turns about the ball $s_3$ which is mounted on the shaft $a_2$ of the lower wing device. The said disk moves concurrently with the ring $L_2$ which rotates at the same speed as the disk, and hence takes the same direction as the disk $c_2$, by means of a cam $d_3$ which remains in contact with a boss $f_2$ of the lever $L_2$. The part of the cam which makes contact consists of a surface portion which comes nearer a plane parallel to the plane of the said disk according as the axis $g''_2$ of the lever $L_2$ comes nearer the common axis $X_2X'_2$ of the rotating wing devices in consideration.

The outline of the said cam surface is such that the distance between the heads $A_2$ and $A_3$ of the links $v_2$ and $v_3$ will be constantly equal to the distance between the axles $g''_2$ and $g''_3$ or between the centres $B_2$ and $B_3$ of the balls $s_2$ and $s_3$.

The boss $f_2$ which is in contact with the cam $d_3$ has a spherical shape and is concentric with the ball by which the link $v_2$ is pivoted to the lever $L_2$. The said boss may be replaced by a round roller which is rotatable on an axis perpendicular to the plane of the lever $L_2$ and passing through the centre of the ball which forms the head of the link $v_2$.

By means of this arrangement, the disk $c_3$ will be constantly parallel to the disk $c_2$.

Obviously, the aforesaid apparatus is susceptible of all suitable modifications in detail, without departing from the principle of the present invention.

What I claim is:—

1. A flying machine of the type described, which comprises in combination, a stationary upright driving shaft, a plurality of rods, a plurality of propeller blades connected to said rods respectively, mechanical means for keeping said rods in fixed radial planes with respect to said shaft, so as to impart the rotary movement of said shaft to said blades, and positive mechanical means for giving one point of each of said rods an oscillatory movement of adjustable amplitude and phase and having a period equal to that of said rotary movement in its radial plane about a fixed point with respect to said shaft, adapted to lift said blade above its normal path only once for each revolution of said blade about said shaft.

2. A flying machine of the type described, which comprises in combination, a stationary upright driving shaft, a plurality of rods, a plurality of propeller blades connected to said rods respectively, mechanical means for keeping said rods in fixed radial planes with respect to said shaft, so as to impart the rotary movement of said shaft to said blades, and positive mechanical means for giving one point of each of said rods an oscillatory movement of adjustable amplitude and phase having a period equal to that of said rotary movement on either side of the position that said point would occupy if said rod were subjected merely to the normal reactions of said blade, said rotary movement being effected in the radial plane of said rod about a fixed point with respect to said shaft.

3. A flying machine of the type described comprising in combination, an upright shaft, a plurality of sector-shaped slideways rigidly secured in radial planes with respect to said shaft, a plurality of slide members mounted in said slideways, a plurality of rods pivoted to said slide members so as to rotate in the radial planes of said slideways respectively, a plurality of propeller blades connected to said rods respectively and positive means for causing said slide members to oscillate in their slideways during the rotation of the upright shaft.

4. A flying machine of the type described comprising in combination, an upright shaft, a plurality of circular slideways having their centers on said shaft rigidly secured in radial planes with respect to said shaft, a plurality of slide members mounted in said slideways, a plurality of rods pivoted to said slide members so as to rotate in the radial planes of said slideways respectively, a sleeve surrounding said upright shaft, a disk surrounding said sleeve, universal coupling means between said disk and said sleeve, a ring coaxial with said disk and adapted to freely rotate about it, means for operatively connecting said disk to said slide members, and means for controlling the angular position of said disk with respect to said sleeve.

5. A flying machine of the type described comprising in combination, an upright shaft, a spherical member rigidly secured to said shaft, provided with a plurality of radial grooves forming slideways disposed in radial planes with respect to said shaft, a plurality of slide members mounted in said slideways, a plurality of rods pivoted to said slide members so as to rotate in the radial planes of said slideways respectively, a plurality of propeller blades connected to said rods respectively, a sleeve surrounding said upright shaft, a disk surrounding said sleeve, a ball and socket joint concentric with said spherical member for connecting said disk to said sleeve, a ring coaxial with said disk and adapted to freely rotate about it, means for operatively connecting said disk to said slide members, and means for controlling the angular position of said disk with respect to said sleeve.

6. A flying machine of the type described comprising in combination, an upright shaft, a plurality of rods pivotally mounted on said shaft in radial planes with respect to said shaft, a plurality of propeller blades secured to said rods, a sleeve surrounding said shaft, a disk surrounding said sleeve, universal coupling means between said disk and said sleeve, a ring coaxial with said disk and adapted to freely rotate about it, a plurality of links each articulated at one end to one of said rods in the radial plane thereof, and at the other end to said ring, and means for controlling the angular position of said disk with respect to said sleeve.

7. A flying machine of the type described comprising in combination, an upright shift, a plurality of rods pivotally mounted on said shaft in radial planes with respect to said shaft, a plurality of propeller blades secured to said rods, a sleeve surrounding said shaft, a disk surrounding said sleeve, a ball and socket joint between said disk and said sleeve, a ring coaxial with said disk and adapted to freely rotate about it, a plurality of links each articulated at one end to one of said rods in the radial plane thereof, and universally pivoted at the other end to said ring, and means for controlling the angular position of said disk with respect to said sleeve.

8. A flying machine of the type described comprising in combination, an upright shaft, a plurality of rods pivotally mounted on said shaft in radial planes with respect to said shaft, a plurality of propeller blades secured to said rods, a sleeve surrounding said shaft, a disk surrounding said sleeve, universal coupling means between said sleeve and said disk, a ring coaxial with said disk and adapted to freely rotate about it, a plurality of links each articulated at one end to one of said rods in the radial plane thereof and at the other end to said ring, a plurality of rods pivotally mounted on said sleeve in radial planes with respect to said shaft, a plurality of propeller blades secured to the last mentioned rods, a sleeve surrounding the first mentioned sleeve, a disk surrounding said second named sleeve, universal coupling means between said last mentioned sleeve and said last mentioned disk, a ring coaxial with said last mentioned disk and adapted to freely rotate about it, a plurality of links each articulated at one end to one of the last mentioned rods in the radial plane thereof and at the other end to said last mentioned ring, means for controlling the angular position of the last mentioned disk with respect to the last mentioned sleeve, and means for maintaining the two disks in parallel relation to each other.

9. A flying machine of the type described comprising in combination, an upright shaft, a plurality of rods pivotally mounted on said shaft in radial planes with respect to said shaft, a plurality of propeller blades secured to said rods, a sleeve surrounding said shaft, a disk surrounding said sleeve, a ball and socket joint between said sleeve and said disk, a ring coaxial with said disk and adapted to freely rotate about it, a plurality of links each articulated at one end to one of said rods in the radial plane thereof and universally pivoted at the other end to said ring, a plurality of rods pivotally mounted on said sleeve in radial planes with respect to said shaft, a plurality of propeller blades secured to the last mentioned rods, a sleeve surrounding said first mentioned sleeve, a ball and socket joint between said last mentioned sleeve and said last mentioned disk, a ring coaxial with the last mentioned disk and adapted to freely rotate about it, a plurality of links each articulated at one end to one of the last mentioned rods in the radial plane thereof and universally pivoted at the other end to said last mentioned ring, means for controlling the angular position of the last mentioned disk with respect to the last mentioned sleeve, and a plurality of arms integral with the first mentioned disk and contacting the second mentioned rods for maintaining the two disks in parallel relation to each other.

In testimony whereof I have signed this specification.

LOUIS BREGUET.